(12) United States Patent
Susca et al.

(10) Patent No.: US 11,725,585 B2
(45) Date of Patent: Aug. 15, 2023

(54) FUEL DELIVERY PUMP SELECTION

(71) Applicant: Hamilton Sundstrand Corporation (HSC), Charlotte, NC (US)

(72) Inventors: Ryan Susca, Windsor, CT (US); Todd Haugsjaahabink, Springfield, MA (US); Morgan O'Rorke, West Hartford, CT (US)

(73) Assignee: Hamilton Sundstrand Corporation (HSC), Charlotte, NC (US)

( * ) Notice: Subject to any disclaimer, the term of this patent is extended or adjusted under 35 U.S.C. 154(b) by 0 days.

(21) Appl. No.: 17/538,965

(22) Filed: Nov. 30, 2021

(65) Prior Publication Data

US 2023/0167773 A1    Jun. 1, 2023

(51) Int. Cl.
*F02C 7/236* (2006.01)
*F02C 7/232* (2006.01)
*F01D 21/00* (2006.01)
*F02C 9/26* (2006.01)
*F02C 9/18* (2006.01)
*F04B 41/06* (2006.01)

(52) U.S. Cl.
CPC .......... *F02C 7/236* (2013.01); *F01D 21/003* (2013.01); *F02C 7/232* (2013.01); *F02C 9/18* (2013.01); *F02C 9/26* (2013.01); *F04B 41/06* (2013.01); *F05D 2220/32* (2013.01)

(58) Field of Classification Search
CPC .. F02C 7/22; F02C 7/232; F02C 7/236; F02C 9/26; F02C 9/30; F01D 21/003; F04B 41/06
USPC ....................................................... 417/286
See application file for complete search history.

(56) References Cited

U.S. PATENT DOCUMENTS

| 2,440,371 | A | 4/1948 | Holley, Jr. |
| 5,116,362 | A | 5/1992 | Arline et al. |
| 7,565,793 | B2* | 7/2009 | Shelby .................. F02C 7/236 |
| | | | 60/734 |
| 8,302,406 | B2* | 11/2012 | Baker ...................... F02C 9/36 |
| | | | 60/734 |
| 8,793,971 | B2 | 8/2014 | Dyer et al. |
| 8,925,329 | B2 | 1/2015 | Godel et al. |

(Continued)

FOREIGN PATENT DOCUMENTS

GB      2289722 A    11/1995

OTHER PUBLICATIONS

Extended European Search Report for European Patent Application No. EP22210519.9, dated Mar. 31, 2023.

*Primary Examiner* — Alain Chau
(74) *Attorney, Agent, or Firm* — Locke Lord LLP; Joshua L. Jones; Gabrielle L. Gelozin

(57) ABSTRACT

In accordance with at least one aspect of this disclosure, a pump selector system can include a primary pump fluidly connected to provide a primary flow to a fluid destination, a secondary pump fluidly connected to provide a secondary flow to the fluid destination, and a selector valve disposed downstream of the primary pump and the secondary pump. The selector valve can be configured to toggle between a first position configured to allow flow from the primary pump to flow to the fluid destination and to block flow from the secondary pump to the fluid destination, and a second position configured to allow flow from the secondary pump to flow to the fluid destination and to block flow from the primary pump to the fluid destination.

17 Claims, 2 Drawing Sheets

(56) References Cited

U.S. PATENT DOCUMENTS

| | | | |
|---|---|---|---|
| 9,677,477 B2* | 6/2017 | Oba | F02C 7/236 |
| 10,138,816 B2* | 11/2018 | Yates | F04B 41/06 |
| 10,428,744 B2 | 10/2019 | Veilleux | |
| 11,486,317 B2* | 11/2022 | Suleiman | F23R 3/36 |
| 2003/0074884 A1* | 4/2003 | Snow | F02C 9/48 |
| | | | 60/764 |
| 2007/0199301 A1* | 8/2007 | Shelby | F02C 9/263 |
| | | | 60/39.281 |
| 2012/0260658 A1 | 10/2012 | Bader et al. | |
| 2016/0146108 A1* | 5/2016 | Yates | F02C 7/236 |
| | | | 415/124.1 |
| 2016/0201564 A1* | 7/2016 | Oba | F23K 5/04 |
| | | | 137/565.3 |
| 2021/0062730 A1* | 3/2021 | Suleiman | F23R 3/36 |

* cited by examiner

FUEL DELIVERY PUMP SELECTION

TECHNICAL FIELD

The present disclosure relates generally to fuel delivery, and more particularly to selection of pumps for fuel delivery.

BACKGROUND

Certain fuel systems can require secondary pumps to back-up the fuel system in the event of a failed primary pump. Architecting these systems can be difficult because at engine start, the health of the secondary pump must be checked to rule out a latent failure.

There is always a need in the art for improvements in pump selection for fuel delivery systems in the aerospace industry. This disclosure provides a solution for this need.

SUMMARY

In accordance with at least one aspect of this disclosure, a pump selector system includes a primary pump fluidly connected to provide a primary flow to a fluid destination, a secondary pump fluidly connected to provide a secondary flow to the fluid destination, and a selector valve disposed downstream of the primary pump and the secondary pump. The selector valve can be configured to toggle between, a first position configured to allow flow from the primary pump to flow to the fluid destination and to block flow from the secondary pump to the fluid destination, and a second position configured to allow flow from the secondary pump to flow to the fluid destination and to block flow from the primary pump to the fluid destination.

A controllable valve can be fluidly connected between a low pressure side of either one of the primary pump and/or the secondary pump, a high pressure side of the primary pump, and a back end of the selector valve. The controllable valve can be configured to provide a high back pressure to the selector valve in a first state of the controllable valve and configured to provide a low back pressure to the selector valve in a second state of the controllable valve. In embodiments, the controllable valve can include a solenoid valve.

The first state of the controllable valve includes a de-energized state of the solenoid valve and the second state of the controllable valve includes an energized state of the solenoid valve. In the first state of the controllable valve, high pressure primary flow from the primary pump can flow through the controllable valve to the back end of the selector valve to counteract high pressure secondary flow from the secondary pump supplied to a front end of the selector valve. The high pressure primary flow is greater than the high pressure secondary flow so as to move the selector valve to block flow from the secondary pump from reaching the fluid destination.

In the second state of the controllable valve, low pressure flow from a low pressure side of either one of the primary pump and/or the secondary pump can flow through the controllable valve to a back end of the selector valve to counteract pressure supplied to a front end of the selector valve by high pressure secondary flow from the secondary pump. The high pressure secondary flow is greater than the low pressure flow so as to move the selector valve to block flow from the primary pump from reaching a fluid destination.

In embodiments, a bleed line can be fluidly connected between the selector valve and a low pressure side of either one of the primary pump and/or the secondary pump, where, in the second position, high pressure primary flow from the primary pump can flow through the selector valve to the bleed line. In certain such embodiments, an orifice can be disposed in the bleed line configured and sized for an initiated built-in test (IBIT) condition such that flow through the orifice guarantees a minimum pressure output of the primary pump.

In embodiments, the primary pump and secondary pump do not both supply high pressure flow to the fluid destination at the same time. In certain embodiments, at least one of the primary and/or secondary pumps can include a positive displacement pump. In certain embodiments, both the primary pump and the secondary pump can include a positive displacement pump. In embodiments, the fluid destination can be a combustor of a gas turbine engine, and the fluid can be or include fuel.

In accordance with at least one aspect of this disclosure, a method for built in testing a fluid delivery system, can include, toggling a selector valve disposed in a fuel line fed by a primary pump and a secondary pump, to block flow from the primary pump and allow flow from the secondary pump, to test functionality of the secondary pump without requiring a high pressure relief for the primary pump.

In embodiments, toggling can include, allowing low pressure flow from a low pressure side of either one of the primary pump and/or the secondary pump to flow through a controllable valve to a back end of the selector valve to counteract high pressure secondary flow from the secondary pump supplied to a front end of the selector valve by high pressure secondary flow from the secondary pump. The high pressure secondary flow can be greater than the low pressure flow so as to move the selector valve to block flow from the primary pump from reaching a fluid destination. The method can further include, bleeding high pressure primary flow from the primary pump through the selector valve during the test to a bleed line, where an orifice is disposed in the bleed line configured and sized such that flow through the orifice guarantees a minimum pressure of the primary pump during the test.

In embodiments, if the functionality of the secondary pump is determined to be operable, toggling can include allowing high pressure primary flow from the primary pump to flow through the controllable valve to the back end of the selector valve to counteract high pressure secondary flow from the secondary pump supplied to the front end of the selector valve. The high pressure primary flow can be greater than the high pressure secondary flow so as to move the selector valve to block flow from the secondary pump from reaching the fluid destination.

In accordance with at least one aspect of this disclosure, a method for selecting a pump in a fluid delivery system, an include toggling a selector valve disposed in a fuel line fed by a primary pump and a secondary pump, to block flow from the primary pump and allow flow from the secondary pump based on an energized state of a controllable valve disposed in the fuel line upstream of the selector valve.

In embodiments, toggling can include de-energizing the controllable valve, and flowing high pressure primary flow from the primary pump through the controllable valve to a back end of the selector valve to counteract high pressure secondary flow from the secondary pump supplied to a front end of the selector valve. The high pressure primary flow can be greater than the high pressure secondary flow so as to move the selector valve to block flow from the secondary pump from reaching a fluid destination.

In embodiments, toggling can include energizing the controllable valve, and flowing low pressure flow from a low pressure side of either one of the primary pump and/or the secondary pump through the controllable valve to a back end of the selector valve to counteract pressure supplied to a front end of the selector valve by high pressure secondary flow from the secondary pump. The high pressure secondary flow can be greater than the low pressure flow so as to move the selector valve to block flow from the primary pump from reaching a fluid destination.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
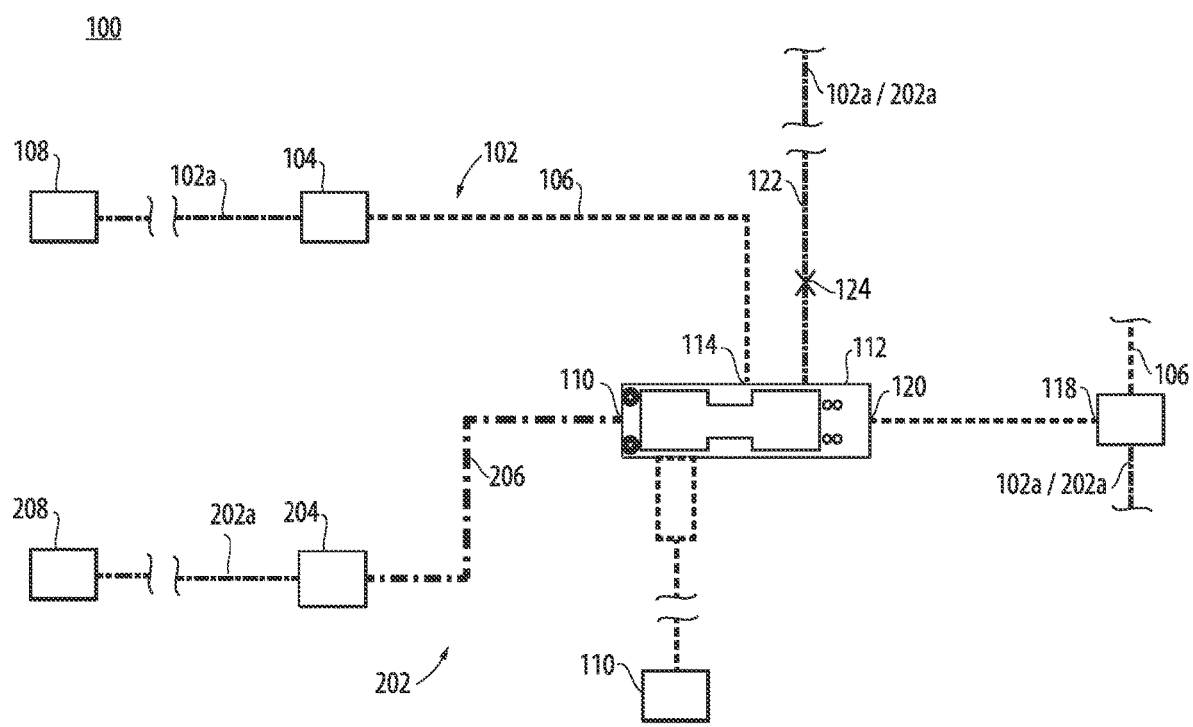
FIG. 1 is a schematic diagram in accordance with this disclosure, showing a fluid delivery system having a selector valve in a first position.
Figure 2:
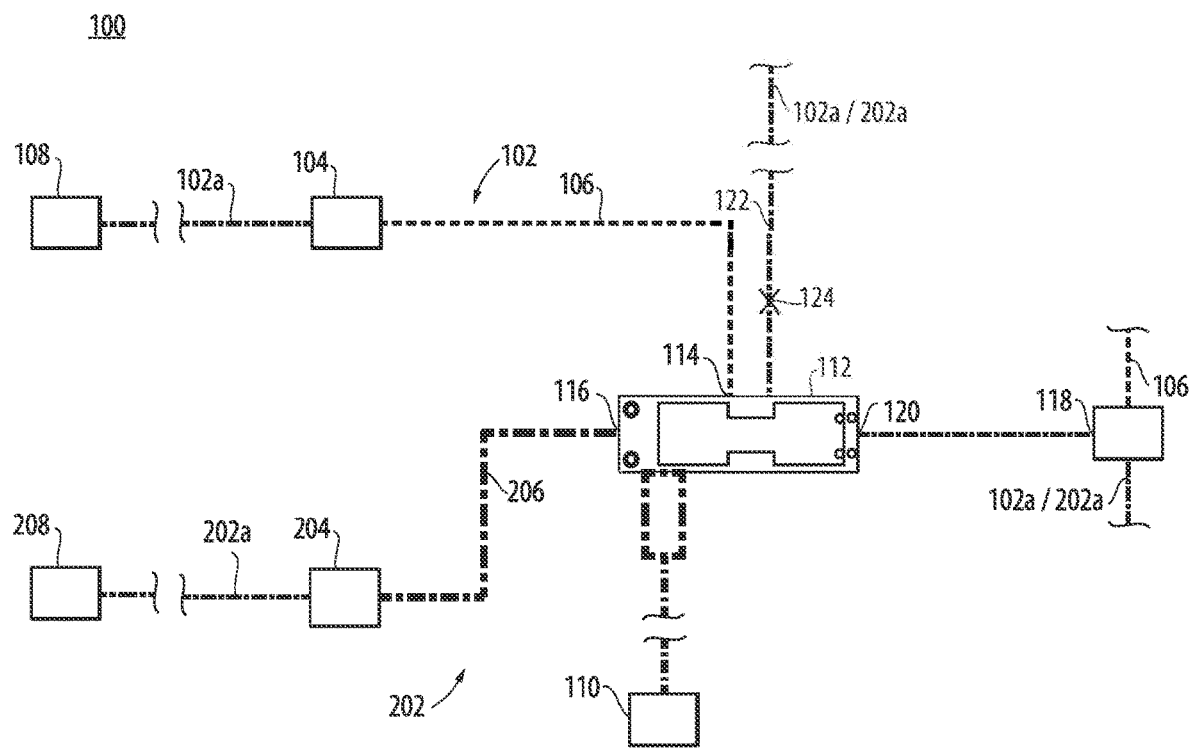
FIG. 2 is a schematic diagram in accordance with this disclosure, showing the fluid delivery system having the selector valve in a second position.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1. Other embodiments and/or aspects of this disclosure are shown in FIG. 2.

In accordance with at least one aspect of this disclosure, a pump selector system 100 can include a primary fluid line 102, having a primary pump 104 fluidly connected to provide a high pressure primary flow 106 from a primary fluid source 108 to a fluid destination 110 and a secondary fluid line 202, having a secondary pump 204 fluidly connected to provide a high pressure secondary flow 206 from a secondary fluid source 208 to the fluid destination 110.

In certain embodiments, at least one of the primary and/or secondary pumps 104, 204 can be or include a positive displacement pump (e.g., a fixed or variable positive displacement pump). In certain embodiments, both the primary and secondary pumps 104, 204 can be or include a positive displacement pump. In embodiments, the primary fluid source 108 and the secondary fluid source 208 can include the same fluid or a different fluid. In certain embodiments, the fluid can include fuel and the fluid destination 110 can include a combustor of a gas turbine engine.

A selector valve 112 can be disposed downstream of both the primary pump 104 and the secondary pump 204, where the primary fluid line 102 and the secondary fluid line 202 can meet at the selector valve, though may remain fluidly isolated. The primary fluid line 102 can connect to the selector valve 112 at a location 114, and the secondary fluid line 202 can connected to the selector valve 112 at a front end 116 of the selector valve 112. The selector valve 112 can be configured to toggle between a first position (e.g. as shown in FIG. 1) and a second position (e.g., as shown in FIG. 2. In the first position, the selector valve 112 can be configured to allow flow from the primary pump 104 to flow to the fluid destination 110 and configured to block flow from the secondary pump 204 to the fluid destination 110. In the second position, the selector valve 112 can be configured to allow flow from the secondary pump 204 to flow to the fluid destination 110 and configured to block flow from the primary pump 104 to the fluid destination 110.

In embodiments, a controllable valve 118 can be fluidly connected between a low pressure side 102a, 202a of either one of the primary pump and/or the secondary pump 104, 204, a high pressure side 106 of the primary pump 104, and a back end 120 of the selector valve 112. The controllable valve 118 can be configured to move between a first state and a second state. In embodiments, the controllable valve 118 can include a solenoid valve where the first state of the controllable valve includes a de-energized state of the solenoid 118 and the second state of the controllable valve includes an energized state of the solenoid 118.

In the de-energized state, the controllable valve 118 can be configured to provide a high back pressure to the back end 120 of the selector valve 112. In this state, high pressure primary flow 106 from the primary pump 104 is allowed to flow through the controllable valve 118 to the back end 120 of the selector valve 112 to counteract high pressure secondary flow 206 from the secondary pump 204 supplied to the front end 116 of the selector valve 112. The high pressure primary flow 106 on the back end 120 of the selector valve 112 can be greater than the high pressure secondary flow 206 so as to move the selector valve 112 to block flow from the secondary pump 204 from reaching the fluid destination 110.

In the energized state, the controllable valve 118 can be configured to provide a low back pressure to the back end 120 of the selector valve 112. In this state, low pressure flow from a low pressure side 102a, 202a of either one of the primary pump 104 and/or the secondary pump 204 is allowed to flow through the controllable valve 118 to the back end 120 of the selector valve 112 to counteract pressure supplied to the front end 116 of the selector valve 112 by high pressure secondary flow 206 from the secondary pump 204. The high pressure secondary flow 206 on the front end 116 of the selector valve 112 can be greater than the low pressure flow 102a, 202a so as to move the selector valve 112 to block flow from the primary pump 104 from reaching the fluid destination 110.

In embodiments, a bleed line 122 can be fluidly connected between the selector valve 112 and a low pressure side 102a, 202a of either one of the primary pump 104 and/or the secondary pump 204 so that in the second position of the selector valve 112, high pressure primary flow 106 from the primary pump 104 can flow through the selector valve 112 to the bleed line 122 and back to the low pressure side 102a, 202a of one or more of the primary 104 and/or secondary pumps 204, while still being prevented from reaching the fluid destination 110.

In embodiments, an in-line orifice 124 can be disposed in the bleed line 122 configured and sized for an initiated built-in test (IBIT) condition such that flow through the in-line orifice 124 guarantees a minimum pressure output of the pump 102, 202, which may be necessary during the IBIT. In certain embodiments, the primary pump 104 and the secondary pump 204 do not both supply high pressure flow 106, 206 to the fluid destination 110 at the same time, such that the primary pump 104 and the secondary pump 204 do not share the load required by the fluid destination 110. Instead, only one of the primary pump 104 or the secondary pump 204 is fluidly connected to supply fluid to the fluid destination 110 at a given time.

In accordance with at least one aspect of this disclosure, a method for built in testing a fluid delivery system 100 (e.g., at an engine startup) can include toggling a selector valve (e.g., valve 112) disposed in a fluid line fed by a primary pump (e.g., pump 104) and a secondary pump (e.g., 204), blocking flow from the primary pump 104 to fluid destination 110, sending flow to bleed line 122, without requiring a high pressure relief for the primary pump 104, and allowing flow from the secondary pump 204 to fluid destination 110, to test functionality of the secondary pump 204, for example as described above.

In embodiments, toggling can include allowing low pressure flow from a low pressure side 102a, 202a of either one of the primary pump 104 and/or the secondary pump 204 to flow through a controllable valve (e.g., valve 118) to a back end 120 of the selector valve 112 to counteract high pressure secondary flow 206 from the secondary pump 204 supplied to a front end 116 of the selector valve 112 by high pressure secondary flow 206 from the secondary pump 204. During the built in test, the method can include bleeding high pressure primary flow 106 from the primary pump 104 through the selector valve 112 to a bleed line (e.g., line 122) through an inline orifice (e.g., orifice 124) disposed in the bleed line 122.

If, during or after the built in test, the functionality of the secondary pump 204 is determined to be operable, the method can further include toggling the selector valve 112 to allow high pressure primary flow 106 from the primary pump 104 to flow through the controllable valve 112 to the back end 120 of the selector valve 112 to counteract high pressure secondary flow 206 from the secondary pump 204 supplied to the front end 116 of the selector valve 112. The high pressure primary flow 106 on the back end 120 of the selector valve 112 can be greater than the high pressure secondary flow 206 on the front end 116 of the selector valve 112 so as to move the selector valve 112 to block flow from the secondary pump 204 from reaching the fluid destination 110. If during or after the built in test, the functionality of the secondary pump 204 is determined to be degraded or inoperable, the method can include isolating the secondary pump 202 from the primary fluid destination 110.

In accordance with at least one aspect of this disclosure, a method for selecting a pump (e.g., between a primary pump 104 and a secondary pump 204) in a fluid delivery system can include toggling a selector valve (e.g., valve 112) disposed in a fluid line fed by the primary pump 104 and the secondary pump 204 to block flow from the primary pump 104 and to allow flow from the secondary pump 204 based on an energized state of a controllable valve (e.g., valve 118) disposed in the fluid line upstream of the selector valve 112.

In embodiments, toggling includes de-energizing the controllable valve 112 and flowing high pressure primary flow 106 from the primary pump 104 through the controllable valve 118 to a back end 120 of the selector valve 112 to counteract high pressure secondary flow 206 from the secondary pump 204 supplied to a front end 116 of the selector valve 112. The high pressure primary flow 106 on the back end 120 of the selector valve 112 can be greater than the high pressure secondary flow 206 so as to move the selector valve 112 to block flow from the secondary pump 204 from reaching the fluid destination 110. In embodiments, toggling can include energizing the controllable valve 118, and flowing low pressure flow from a low pressure side 102a, 202a of either one of the primary pump 104 and/or the secondary pump 204 through the controllable valve 118 to the back end 120 of the selector valve 112 to counteract pressure supplied to the front end 116 of the selector valve 112 by high pressure secondary flow 206 from the secondary pump 204. The high pressure secondary flow 206 on the front end 116 of the selector valve 112 can be greater than the low pressure flow 102a, 202a on the back end 120 of the selector valve 112 so as to move the selector valve 112 to block flow from the primary pump 104 from reaching the fluid destination 110.

Embodiments can include a main positive displacement, a back-up pump, a selector valve and a solenoid. In a first state, the solenoid can be de-energized, porting high pressure flow from the main pump to the selector valve, allowing the main pump to supply flow to the flow demand. In a second state, the solenoid can be energized, porting low pressure flow to the selector valve allowing the back up pump to supply flow to the flow demand, while flow from the main pump ports to a separate flow path having an in-line orifice. In embodiments, the orifice can be sized to guarantee minimum main pump pressure, for example as required for the IBIT.

When starting an engine it is necessary to determine that selector valve is functioning after the previous operation. Performing such a test may require placing the main pump into high pressure relief. But putting the main pump into high pressure relief at every engine start may add significant pressure cycles to the engine and pump components/housings (e.g., adding weight, cost, and the like) as well as add significant parasitic loss to the engine (e.g., via horsepower and heat). Therefore, embodiments allow for the second state to be triggered during an engine start without putting the main pump onto high pressure relief.

To accommodate the demand of modern engines, both of the main pump and the backup pump can be positive displacement pumps. Typically selector valves may be pump sharing valves, however, embodiments include a full selector valve, allowing for both pump selection, and a built in test while utilizing two positive displacement pumps, rather than centrifugal pumps, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A pump selector system, comprising:
   a primary pump fluidly connected to provide a primary flow to a fluid destination;
   a secondary pump fluidly connected to provide a secondary flow to the fluid destination; and
   a selector valve disposed downstream of the primary pump and the secondary pump configured to toggle between:
     a first position configured to allow flow from the primary pump to flow to the fluid destination and to block flow from the secondary pump to the fluid destination; and
     a second position configured to allow flow from the secondary pump to flow to the fluid destination and to block flow from the primary pump to the fluid destination; and
   a controllable valve fluidly connected between a low pressure side of either one of the primary pump and/or the secondary pump, a high pressure side of the primary pump, and a back end of the selector valve, configured to provide a high back pressure to the selector valve in a first state of the controllable valve and configured to provide a low back pressure to the selector valve in a second state of the controllable valve.

2. The system as recited in claim 1, wherein the controllable valve includes a solenoid valve.

3. The system as recited in claim 2, wherein the first state of the controllable valve includes a de-energized state of the solenoid valve and the second state of the controllable valve includes an energized state of the solenoid valve.

4. The system as recited in claim 1, wherein in the first state of the controllable valve, high pressure primary flow from the primary pump is allowed to flow through the controllable valve to the back end of the selector valve to counteract high pressure secondary flow from the secondary pump supplied to a front end of the selector valve, wherein the high pressure primary flow is greater than the high pressure secondary flow so as to move the selector valve to block flow from the secondary pump from reaching the fluid destination.

5. The system as recited in claim 1, wherein in the second state of the controllable valve, low pressure flow from a low pressure side of either one of the primary pump and/or the secondary pump is allowed to flow through the controllable valve to a back end of the selector valve to counteract pressure supplied to a front end of the selector valve by high pressure secondary flow from the secondary pump, wherein the high pressure secondary flow is greater than the low pressure flow so as to move the selector valve to block flow from the primary pump from reaching a fluid destination.

6. The system as recited in claim 1, further comprising a bleed line fluidly connected between the selector valve and a low pressure side of either one of the primary pump and/or the secondary pump, wherein in the second position, high pressure primary flow from the primary pump flows through the selector valve to the bleed line.

7. The system as recited in claim 6, further comprising an orifice disposed in the bleed line configured and sized for an initiated built-in test (IBIT) condition such that flow through the orifice guarantees a minimum pressure output of the primary pump.

8. The system as recited in claim 1, wherein the primary pump and secondary pump do not both supply high pressure flow to the fluid destination at the same time.

9. The system as recited in claim 1, wherein at least one of the primary and/or secondary pumps includes a positive displacement pump.

10. The system as recited in claim 9, wherein both the primary pump and the secondary pump include a positive displacement pump.

11. The system as recited in claim 1, wherein the fluid destination is a combustor of a gas turbine engine.

12. The system as recited in claim 11, wherein the fluid includes fuel.

13. A method for built in testing a fluid delivery system, comprising:
   toggling a selector valve disposed in a fuel line fed by a primary pump and a secondary pump, to block flow from the primary pump and allow flow from the secondary pump, to test functionality of the secondary pump without requiring a high pressure relief for the primary pump wherein toggling includes, allowing low pressure flow from a low pressure side of either one of the primary pump and/or the secondary pump to flow through a controllable valve to a back end of the selector valve to counteract high pressure secondary flow from the secondary pump supplied to a front end of the selector valve by high pressure secondary flow from the secondary pump, wherein the high pressure secondary flow is greater than the low pressure flow so as to move the selector valve to block flow from the primary pump from reaching a fluid destination.

14. The method as recited in claim 13, further comprising:
   bleeding high pressure primary flow from the primary pump through the selector valve during the test to a bleed line, wherein an orifice is disposed in the bleed line configured and sized such that flow through the orifice guarantees a minimum pressure of the primary pump during the test.

15. The method as recited in claim 14, wherein, if the functionality of the secondary pump is determined to be operable, toggling includes allowing high pressure primary flow from the primary pump to flow through the controllable valve to the back end of the selector valve to counteract high pressure secondary flow from the secondary pump supplied to the front end of the selector valve, wherein the high pressure primary flow is greater than the high pressure secondary flow so as to move the selector valve to block flow from the secondary pump from reaching the fluid destination.

16. A method for selecting a pump in a fluid delivery system, comprising:
  toggling a selector valve disposed in a fuel line fed by a primary pump and a secondary pump, to selectively block flow from the primary pump and allow flow from the secondary pump or allow flow from the primary pump and block flow from the secondary pump based on an energized state of a controllable valve disposed in the fuel line upstream of the selector valve, wherein toggling includes:
  energizing the controllable valve; and
  flowing low pressure flow from a low pressure side of either one of the primary pump and/or the secondary pump through the controllable valve to a back end of the selector valve to counteract pressure supplied to a front end of the selector valve by high pressure secondary flow from the secondary pump, wherein the high pressure secondary flow is greater than the low pressure flow so as to move the selector valve to block flow from the primary pump from reaching a fluid destination.

17. A method for selecting a pump in a fluid delivery system, comprising:
  toggling a selector valve disposed in a fuel line fed by a primary pump and a secondary pump, to selectively block flow from the primary pump and allow flow from the secondary pump or allow flow from the primary pump and block flow from the secondary pump based on an energized state of a controllable valve disposed in the fuel line upstream of the selector valve, wherein toggling includes:
  de-energizing the controllable valve; and
  flowing high pressure primary flow from the primary pump through the controllable valve to a back end of the selector valve to counteract high pressure secondary flow from the secondary pump supplied to a front end of the selector valve, wherein the high pressure primary flow is greater than the high pressure secondary flow so as to move the selector valve to block flow from the secondary pump from reaching a fluid destination.

\* \* \* \* \*